United States Patent [19]  [11] 4,143,063
Alberino et al.  [45] Mar. 6, 1979

[54] PREPARATION OF CARBODIIMIDE-CONTAINING POLYISOCYANATES

[75] Inventors: Louis M. Alberino; Curtis P. Smith, both of Cheshire, Conn.

[73] Assignee: The Upjohn Company, Kalamazoo, Mich.

[21] Appl. No.: 894,737

[22] Filed: Apr. 10, 1978

Related U.S. Application Data

[63] Continuation-in-part of Ser. No. 764,373, Jan. 31, 1977, abandoned.

[51] Int. Cl.$^2$ .......................................... C07C 119/055
[52] U.S. Cl. ..................... 260/453 SP; 260/239 A; 260/453 A; 260/453 AL; 260/453 AM; 260/453 AR; 252/431 R; 252/426; 526/19; 526/42; 526/240; 526/47
[58] Field of Search ............... 260/453 AR, 453 AL, 260/453 AM, 566 R, 453 SP, 25 BF

[56] References Cited

U.S. PATENT DOCUMENTS 3,406,198   10/1968   Budnick ............................. 260/551

Primary Examiner—Dolph H. Torrence
Attorney, Agent, or Firm—Denis A. Firth; John Kekich

[57] ABSTRACT

A process is described for converting organic polyisocyanates to carbodiimide-containing polyisocyanates by heating said organic polyisocyanates in the presence of an organoarsine-substituted polystyrene carbodiimide-forming catalyst until a desired level of conversion is achieved, followed by separation of catalyst from product. It is thus possible to obtain a carbodiimide-containing polyisocyanate which is free from catalyst and hence free from the possibility that carbodiimide formation can continue on storage of the product. In a particular embodiment the process is employed to convert methylenebis(phenyl isocyanate), which is normally solid at ambient temperatures, to a storage stable liquid product. The polymeric catalysts employed in the process are characterized by a recurring unit of the formula:

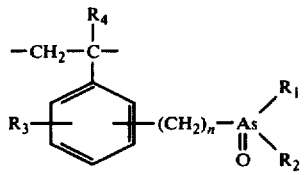

wherein $R_1$ and $R_2$ are hydrocarbyl, $R_3$ is hydrogen, chloro or methyl, $R_4$ is hydrogen or methyl and n is 0 or 1.

8 Claims, No Drawings

PREPARATION OF CARBODIIMIDE-CONTAINING POLYISOCYANATES

CROSS-REFERENCE TO RELATED APPLICATION

This application is a continuation-in-part of copending application Ser. No. 764,373 filed Jan. 31, 1977 and now abandoned.

BACKGROUND OF THE INVENTION

1. Field of the Invention

This invention relates to the preparation of modified organic polyisocyanates and is more particularly concerned with the preparation of carbodiimide-containing polyisocyanates and with the products so obtained.

2. Description of the Prior Art

The conversion of organic polyisocyanates to the corresponding carbodiimides by heating said polyisocyanates in the presence of appropriate carbodiimide-forming catalysts is well-known; see, for example, U.S. Pat. Nos. 3,056,835 and 3,157,662. These latter processes generally give rise to complete conversion of the organic polyisocyanates to the corresponding carbodiimides due to the high level of activity of the catalysts employed.

It is also known to convert an organic polyisocyanate only partially to carbodiimide thereby obtaining a polyisocyanate containing carbodiimide groups. This result has been achieved simply by heating the organic polyisocyanate at elevated temperatures for relatively long periods (see U.S. Pat. No. 3,152,162), or by reacting the organic polyisocyanate with a monomeric carbodiimide (see U.S. Pat. No. 3,267,137) or by heating the organic polyisocyanate with a relatively mild catalyst such as a trialkyl phosphate (see U.S. Pat. No. 3,384,653). However, these various methods of preparing carbodiimide-containing polyisocyanates all suffer the disadvantage that prolonged heating of the polyisocyanate is necessary. This gives rise to undesirable side effects particularly a darkening in color of the product. This problem could be overcome by using a much more reactive catalyst to produce the carbodiimide but, unfortunately, the use of such catalysts results in complete conversion of isocyanate to carbodiimide as it is generally not possible to stop the reaction at an intermediate stage.

U.S. Pat. No. 3,761,502 describes the use of tris(chloromethyl)phosphine oxide as catalyst in the production of carbodiimide-containing polyisocyanates. This particular catalyst is said to have the advantage that lower temperatures and shorter reaction times can be used in the conversion and that the formation of carbodiimide can be halted at any desired time by cooling the reaction mixture to below 30° C. However, the process suffers the disadvantage that the resulting product still contains the catalyst. The presence of the latter may interfere with the outcome of subsequent reactions, such as the formation of polyurethanes. In addition the continuing presence of the catalyst in the product can result in continued, if very slow, conversion of isocyanate to carbodiimide while the product is being stored before its ultimate use. Since the formation of carbodiimide involves the elimination of carbon dioxide, there is thus a potential hazard involving build up of pressure in the closed vessels in which the product is being stored.

Very recently, but subsequent to the making of the present invention, a process has been described in which carbodiimide-containing polyisocyanates are prepared by heating the organic polyisocyanate in the presence of a polymeric catalyst which is the salt of a polymer containing basic amino groups with a 1-oxophospholane-phosphoric acid. At the end of the reaction the polymer catalyst is removed by filtration or like means. The use of these catalysts still requires relatively high reaction temperatures (of the order of 150° C. or higher) and lengthy reaction times.

We have now found that carbodiimide-containing polyisocyanates can be prepared using certain polymeric catalysts which permit the use of relatively low reaction temperatures and very short reaction times but which can be removed readily from the reaction product thereby preventing subsequent carbodiimide formation on storage of the product. Other advantages of the process of the invention will be apparent from the following description.

SUMMARY OF THE INVENTION

This invention comprises a process for preparing a carbodiimide-containing organic polyisocyanate which process comprises the steps of:

heating an organic polyisocyanate to a temperature in the range of 70° C. to about 200° C. in the presence of a catalytic amount of a polymer characterized by a recurring unit of the formula:

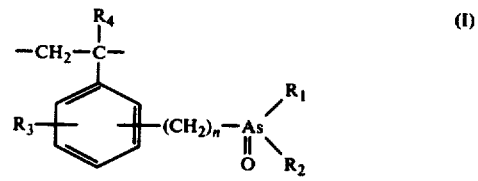

wherein $R_1$ and $R_2$ are hydrocarbyl free from substituents reactive with isocyanate groups, $R_3$ is selected from the class consisting of hydrogen, chloro and methyl, $R_4$ is selected from the class consisting of hydrogen and methyl, and n is an integer from 0 to 1;

continuing said heating until the desired proportion of carbodiimide-formation has occurred; and stopping said reaction by separating the solid catalyst from the carbodiimide-containing organic polyisocyanate.

DETAILED DESCRIPTION OF THE INVENTION

The process of the invention is carried out by bringing the organic polyisocyanate and the polymeric catalyst together, in any convenient manner, and maintaining the temperature of the mixture in the above-stated range, and preferably in the range of about 100° C. to about 140° C., until the desired proportion of isocyanate has been converted to carbodiimide. The formation of carbodiimide can be followed readily by measuring the amount of carbon dioxide which has been generated. Thus, for each two equivalents of isocyanate which react to form 1 mole of carbodiimide, there is generated 1 mole of carbon dioxide:

$$2RNCO \rightarrow R\text{-}N{=}C{=}N\text{-}R + CO_2$$

When the desired amount of conversion of organic polyisocyanate to carbodiimide has been achieved, the reaction can be stopped substantially immediately by separating the carbodiimide-containing polyisocyanate from the catalyst by filtration, centrifugation or like means. As is well recognized in the art, the carbodiimide-containing polyisocyanate so obtained will undergo the formation of an adduct by interaction of free isocyanate groups with carbodiimide groups to form a uretidinedione-imine in accordance with the following reaction scheme.

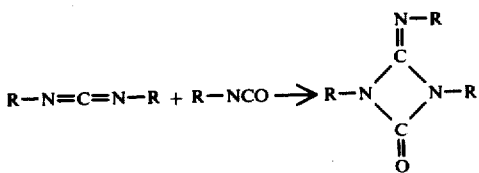

The formation of the adduct is readily reversible by heating whereupon the free isocyanate and carbodiimide are regenerated.

The process of the invention can be carried out on a batch basis by suspending the polymeric catalyst in the polyisocyanate, after melting the latter by heating if necessary, and subjecting the mixture to vigorous agitation during the reaction period. If desired, the reaction can be carried out in the presence of an inert organic solvent, particularly when the polyisocyanate is not readily liquefied upon heating. By inert organic solvent is meant an organic solvent which does not enter into reaction with either of the main reactions or otherwise interfere with the desired course of the reaction. Illustrative of such solvents are benzene, toluene, xylene, tetrachlorobenzene, dichlorobenzene, decalin, tetralin, tetrahydrofuran, chloroform, diglyme (diethylene glycol dimethyl ether), N,N-dimethylacetamide, tetramethylene sulfone, and the like.

The process of the invention is particularly readily adaptable to continuous operation. Thus, the polymeric catalyst can be supported in a column through which the organic polyisocyanate, heated to a temperature in the above stated range, is passed. The rate of flow of isocyanate through the column of catalyst can be adjusted so that any desired degree of conversion of isocyanate to carbodiimide can be attained in a single passage through the column. Alternatively, the organic isocyanate can be passed through a series of columns of catalyst until the desired degree of conversion of isocyanate to carbodiimide is achieved. In such a process the carbodiimide-containing polyisocyanate obtained as product is automatically separated from the catalyst and no additional separation step is necessary at the end of the reaction.

The proportion of polymer having the recurring unit (I) to organic polyisocyanate employed in the process of the invention is catalytic, i.e. there is less than 1 molar proportion of polymer catalyst per mole of organic polyisocyanate. Generally, in the batch type procedure, the proportion of polymer catalyst to organic polyisocyanate is within the range of about 0.05 to about 10 mole percent and is preferably in the range of about 0.1 to about 5 mole percent. In the case of a continuous process the proportions can be varied over a wider range depending upon the manner in which the operation is carried out. In general, however, the above proportions would apply in the continuous operation also.

The process of the invention can be applied to the conversion of any organic polyisocyanate to the corresponding carbodiimide-containing polyisocyanate. Thus the organic polyisocyanate can be any known aliphatic, aromatic or aralkyl polyisocyanate containing two or more isocyanate groups. Illustrative of such organic polyisocyanates are 2,4-tuluene diisocyanate, 2,6-toluene diisocyanate or mixtures thereof, 4,4'-methylenebis(phenyl isocyanate), 2,4'-methylenebis(phenyl isocyanate), 2,2'-methylenebis(phenyl isocyanate), 4,4'-methylenebis(cyclohexyl isocyanate), 2,4'-methylenebis(cyclohexyl isocyanate), 2,2'-methylenebis(cyclohexyl isocyanate), polymethylene polyphenyl polyisocyanate, $\alpha,\alpha'$-xylylene diisocyanate, $\beta,\beta'$-diethylbenzene diisocyanate, 4,4',4''-triphenylmethylene triisocyanate, o-tolidine diisocyanate, hexamethylene diisocyanate, octamethylene diisocyanate, decamethylene diisocyanate, and the like such as those polyisocyanates listed by Siefkin, Ann. 562, 122–135, 1949. Mixtures of two or more of the above isocyanates can be employed if desired.

The polymeric catalysts characterized by the recurring unit (I) are obtained by chemical modification of at least some of the recurring units of a polystyrene or by first introducing the appropriate organo-arsenic substituents into the benzene ring of a styrene monomer and then polymerizing or copolymerizing the monomer.

Illustratively, the polymer catalysts can be prepared from the corresponding polystyrene using the following sequence of steps. The starting polystyrene is converted to the corresponding nuclear brominated or chloromethylated derivative using the procedures described by Relles et al., JACS, 96, 6469, 1974. The bromination of the polystyrene is accomplished by reacting the latter with bromine in the presence of a catalyst such as boron trifluoride. The chloromethylation is achieved by reacting the polystyrene with chloromethyl methyl ether in the presence of boron trifluoride. By appropriate choice of the molar proportions of bromine or chloromethyl methyl ether to polystyrene it is possible to introduce a bromo or chloromethyl into any given proportion, or all, of the benzene nuclei in the polystyrene.

The intermediate bromo or chloromethylated polystyrene so obtained is then reacted with the appropriate dihydrocarbyl arsine halide, $R_1R_2AsHal$, wherein $R_1$ and $R_2$ have the significance hereinbefore defined and Hal represents chloro, bromo or iodo. The reaction is carried out in the presence of lithium using the conditions described by Relles et al., supra, for the analogous condensation of the bromo and chloromethylated polystyrenes with chlorodiphenylphosphine. Illustratively, the reactants are brought together in the presence of a solvent such as tetrahydrofuran, dimethylformamide, dimethylacetamide, tetramethylene sulfone, cyclohexane, benzene, toluene, and the like, and the mixture is maintained under an inert atmosphere such as nitrogen while an excess of metallic lithium, advantageously in the form of newly extruded wire, is added. The reaction is generally conducted at ambient temperature (20°–25° C.) but higher temperatures, e.g. temperatures up to about the reflux temperature of the solvent employed, can be used if desired.

Depending upon the nature of the polystyrene employed as starting material and upon the solvents employed, the above reactions are carried out with the polystyrene or polystyrene derivative in solution or present as an insoluble solid phase. Thus, where the starting material is a polystyrene which has not been cross-linked by copolymerization with, for example, a minor amount of divinylbenzene, the polystyrene is soluble in polar solvents and the above reactions can be carried out in solution. The final product is isolated by, for example, precipitation by the addition of an aliphatic alcohol, such as methanol, or like solvents in which the product is insoluble. On the other hand, where the starting polystyrene is not soluble to any substantial degree in polar or other solvents, the polystyrene is generally reacted, in the form of beads, powdered material or other forms having relatively small particle size, in suspension and with agitation as appropriate.

The organoarsine-substituted polystyrenes thus obtained are then subjected to oxidation using hydrogen peroxide or like oxidizing agents to obtain the final polymers having the recurring unit (I). The reaction can be carried out by dissolving or suspending the organoarsinepolystyrene in a polar solvent, such as those set forth above, and adding the oxidizing agent thereto. The reaction is advantageously carried out at ambient temperatures, but higher temperatures (up to about 70° C.) can be employed if desired.

Any of the commonly available forms of polystyrene can be employed in preparing the polymers of the invention using the above series of reactions. The commonly available polystyrenes include the homopolymer of styrene itself, the copolymer of styrene and a minor amount of divinylbenzene (generally 2 percent by weight but higher or lower amounts can be employed if desired), the homopolymers of vinyltoluene, α-methylstyrene and chlorostyrene as well as the copolymers formed from two or more of the aforementioned monomers. For a detailed description of these various forms of polystyrene and methods for their preparation see, for example, Encyclopedia of Polymer Science and Technology, Vol. 13, p. 128 et seq., John Wiley and Sons, New York, 1970.

As mentioned above, it is possible to adjust the proportion of nuclear benzene rings in the starting polystyrene which are subjected to substitution by bromine or chloromethyl, followed by reaction with the organoarsine halide $R_1R_2AsHal$, so that from as low as about 0.1% to about 100% of the recurring units in the resulting polymer have the formula (I) above. The actual choice of level of organoarsenic-substituted recurring units (I) in the polymers used as catalysts in accordance with the invention in any particular instance will depend upon a number of factors. Thus, in general, it is found that the greater the percentage of recurring units (I) in the polymer catalyst, the faster is the rate at which the conversion of isocyanate to carbodiimide will occur. Thus, where it is desirable to be able to exercise fairly careful control of the rate of reaction, it is preferable to employ catalysts which have a percentage of recurring units (I) in the lower end of the above range. Further, in the case of continuous operations in which the isocyanate starting material is being passed through a bed or column of the catalyst, it is clearly desirable that reaction does occur so rapidly that high concentrations of carbodiimide are generated rapidly with resultant possible plugging of the column due to separation of solid or formation of highly viscous liquid. Overall economics of the conversion of isocyanate to carbodiimide also play a role since the arsenic compounds employed in preparation of the polymer catalysts contribute significantly to the overall cost of the catalyst. Hence, the higher the concentration of recurring units (I) in the polymer catalyst, the higher is the cost of the catalyst.

When less than 100% of the recurring units in the resulting polymer have the formula (I), the remainder of the recurring units in said polymer will obviously be those corresponding to the starting polystyrene. It will also be apparent that, by subjecting the intermediate bromo or chloromethylated polystyrene to reaction with less than the stoichiometric amount of one organoarsine halide $R_1R_2AsHal$ and then subjecting the product so obtained to reaction with a second and different organoarsine halide, it is possible to obtain a polymer which contains two different organoarsine residues in the molecule. Similarly, polymers having three or more different organoarsine residues in the molecule can be obtained by extension of the above reaction.

It has been found that, when preparing the polymer catalysts of the invention having a low level of content of recurring units (I) by the process involving initial bromination of the polystyrene, not all of the bromine atoms introduced into the polymer are replaced by organoarsine moieties and the resulting final polymer contains recurring units having bromine atoms as well as recurring units (I) and the unchanged recurring units of the starting material. However, the presence of these bromine-substituted units does not materially affect the catalytic activity of the polymers in question when used in the process of the invention.

The organoarsine halides $R_1R_2AsHal$ which are employed in the preparation of the above polymers are, for the most part, known compounds which can be prepared by procedures known in the art; see, for example, Chemistry of Carbon Compounds, Edited by E. H. Rodd, Vol. IA, p. 449, 1951, for aliphatic arsine halides; ibid, Vol. IIIA, pp. 404-5, 1954, for the aryl arsine halides and the references cited therein.

In an alternative method of preparing the polymers having the recurring unit(I) a monomer of the formula

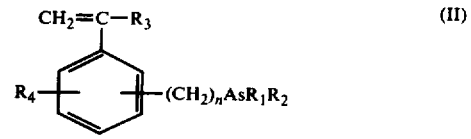

(II)

wherein $R_1$, $R_2$, $R_3$, $R_4$ and n have the significance hereinbefore defined, is homopolymerized or copolymerized with styrene, α-methylstyrene, chlorostyrene or vinyltoluene using methods well-known in the art, supra. The resulting organoarsine-substituted polymer is then subjected to oxidation to form the corresponding arsine oxide using the procedure described above.

The arsine-substituted monomers (II) are prepared by reaction of the appropriate nuclear-brominated or chloromethylated styrene monomer and the appropriate dihydrocarbylarsine halide $R_1R_2AsHal$ using the reaction conditions described above for the corresponding reaction involving the brominated or chloromethylated polystyrene.

The polymers having the recurring unit (I) at any of the levels discussed above can be provided in various physical forms and particle sizes, for example, by appropriate selection of the starting polystyrene employed in their preparation or by appropriate control of the polymerization where said polymers are derived from the monomers (II). A particularly useful form consists of beads of a partly cross-linked polystyrene. Such beads tend to swell in the presence of certain solvents thereby enhancing pore size and opening up additional sites of catalysis.

The carbodiimide-containing organic polyisocyanates obtained in accordance with the process of the invention are useful in the preparation of, for example, polyurethanes and like isocyanate-based polymers and have the advantage that the carbodiimide groups in the molecule impart to the polymer stability to degradation by exposure to light, heat, hydrolytic conditions and the like, as is well-known in the art. In addition, the process of the invention gives rise to products which, for the most part, are colorless liquids which are stable on storage and are readily handled using conventional polymer mixing and dispensing devices, all of which properties are frequently a marked improvement over the properties of the starting organic polyisocyanates.

In a particular embodiment of the process of the invention a methylenebis(phenyl isocyanate) which is normally a solid at ambient temperature and has a melting point of about 41° C., is converted to a liquid carbodiimide-containing diisocyanate which remains a colorless liquid upon storage at temperatures as low as −20° C. for prolonged periods. Any of the isomers of methylenebis(phenyl isocyanate), or mixtures of such isomers, can be employed as starting material in this embodiment. Generally the most common form of methylenebis(phenyl isocyanate) available commercially contains from about 95 to 98 percent of the 4,4'-isomer, the remainder of the product being mainly 2,4'-isomer with some 2,2'-isomer. This type of material, as well as those types which contain higher proportions of 2,4'-isomer, can be used most advantageously in this embodiment of the invention. This embodiment of the process of the invention can also be applied to polymethylene polyphenyl isocyanates which contain from about 60 to about 90 percent by weight of methylenebis(phenyl isocyanates). Such products frequently deposit solids on standing for prolonged periods and the process of the invention can be used to convert these products to storage stable liquids.

In carrying out the process, as applied to this particular embodiment, the heating of the diisocyanate starting material and the polymer catalyst, whether carried out in a batch or continuous type operation, is continued until the conversion of isocyanate groups to carbodiimide has proceeded to the extent that about 3 percent to about 25 percent of the original isocyanate groups have been converted. At this point the catalyst is separated from the carbodiimide-containing isocyanate and the latter is cooled to room temperature (circa 20° C.). After allowing the mixture to stand for several days to complete the formation of the adduct (uretidinedione-imine), the mixture has an isocyanate equivalent in the range of about 130 to about 190 and is a clear, water white liquid.

The product produced by the above embodiment has a number of advantages over that produced in accordance with U.S. Pat. No. 3,384,653. The latter product was obtained using a trialkylphosphate as carbodiimide-forming catalyst, which catalyst was not removed from the reaction product at the end of the reaction. The product produced in accordance with the present invention is water-white (in contrast to the brown color of the prior product), contains no catalyst to interfere with subsequent reactions and, possibly, to generate further carbodiimide formation, and is obtained in a process which involves very much shorter reaction times and lower temperatures.

The process of the invention in general, as well as in the particular embodiment described above, is characterized by the rapidity with which it can be carried out and the ease with which it can be stopped at any given time by the simple process of separating the product from the catalyst suspended therein. Further, it is found that the catalyst recovered from any run can be reused a plurality of times for further conversions of organic polyisocyanates to carbodiimide-containing organic polyisocyanates.

The following preparations and examples describe the manner and process of making and using the invention and set forth the best mode contemplated by the inventors of carrying out the invention but are not to be construed as limiting.

PREPARATION 1

A. The procedure of Relles et al., supra, for the bromination of polystyrene was repeated exactly as described. The polystyrene employed as starting material was 2% divinylbenzene cross-linked polystyrene (200–400 mesh:Eastman Kodak). The brominated product was found to contain 42.98 percent by weight of bromine indicating that 98.4 percent of the benzene nuclei in the polymer contained a bromine atom.

B. A suspension of 3.5 g. (0.019 mole repeating units) of the brominated polystyrene (obtained as described above) in 90 ml. of tetrahydrofuran was stirred vigorously at ambient temperature (circa 20° C.) while a solution of 10 g. (0.0378 mole) of diphenylarsine chloride in 30 ml. of tetrahydrofuran was added followed by 0.64 g. (0.09 g-atoms) of lithium wire. The reaction mixture gradually turned orange-red. After stirring for 24 hours at ambient temperature the reaction mixture was filtered. The solid which was isolated was washed by slurrying successively with 2:3, 3:1 and 9:1 mixtures by volume of methylene chloride and methanol and finally with pure methanol. There was thus obtained, as a pale yellow solid, an organoarseno-substituted polystyrene characterized by the following recurring unit:

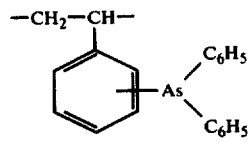

C. A suspension of 5.6 g. of the above organosenosubstituted polystyrene in 50 ml. of acetone was stirred while 2.8 g. (0.025 mole) of 30 percent v/v hydrogen peroxide was added. The resulting mixture was then allowed to stand at room temperature (circa 20° C.) for several days. At the end of this time there was added 50 ml. of benzene and the mixture was refluxed using a Dean and Stark apparatus to remove water azeotropically. The dried suspension was then filtered and the insoluble material was washed by slurrying successively with 3:1, 2:3, 3:1 and 9:1 mixtures by volume of methylene chloride and methanol and finally with pure methanol. The product was finally dried in an oven at 80° C. There was thus obtained a polymer characterized by the recurring unit

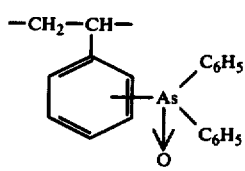

and having a content of arsenic of 20.485 percent.

PREPARATION 2

Using the procedure described in Preparation 1, but replacing the diphenylarsine chloride employed in Step B by chlorodiethylarsine, chlorodimethylarsine, bromodicyclohexylarsine, and ethylphenylchloroarsine, there are obtained the corresponding oxides of the organoarseno polystyrenes.

PREPARATION 3

Using the procedure described by Relles et al., supra, a 2% divinylbenzene cross-linked polystyrene (200–400 mesh: Eastman Kodak) is chloromethylated by reaction with chloromethyl methyl ether in the presence of boron trifluoride.

Using the procedure described in Preparation 1, part B, but replacing the brominated polystyrene there employed by the chloromethylated polystyrene prepared as described above, there is obtained the polystyrene characterized by the recurring unit

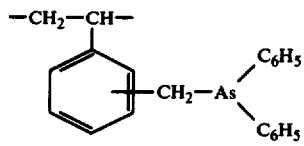

The latter is then oxidized using the procedure described in Preparation 1, part C, to obtain the corresponding oxide characterized by the recurring unit

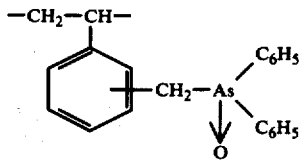

PREPARATION 4

A batch of 101.3 g. of 1% divinylbenzene crosslinked polystyrene beads (200–400 mesh:Bio-Rad Laboratories) was subjected to washing firstly with 1000 ml of a mixture of methylene chloride (9 vol.) and methanol (1 vol.), then successively with 500 ml. portions of mixtures of methylene chloride and methanol in the ratios by volume of 3:1, 2:3 and 9:1, respectively, and finally with 500 ml. of methylene chloride alone. The washed beads were dried in vacuo at 80° C.

To a suspension of 40.6 g. of the washed polystyrene beads (obtained as described above) in 450 ml. of nitromethane was added a solution of 22.3 g. of boron trifluoride etherate in 50 ml. of nitromethane. The mixture was stirred at room temperature (circa 20° C.) while a total of 12.5 g. of bromine was added dropwise and stirring of the mixture was continued for a short period after the addition was complete. The mixture so obtained was filtered and the brominated polystyrene so isolated was washed successively with 50 ml. of methylene chloride, 50 ml. of methanol, 200 ml. of methylene chloride and then with 200 ml. portions of mixtures of methylene chloride and methanol in the ratios by volume of 2:3, 3:1, and 9:1, respectively, and finally with 200 ml. of methylene chloride alone. The washed product was dried at 80° C. under a pressure of 15 mm. of mercury for 5 hours to give 41.6 g. of partially brominated polystyrene. Found: Br 3.27%. If each phenyl ring had been substituted by an atom of bromine, the content of bromine would be 43.7%. Hence, the percentage of phenyl rings in the polystyrene which have been substituted by bromine is (3.27/43.7) = 7.5%.

A slurry of 28.5 g. of the partially brominated polystyrene (obtained as described above) in 180 ml. of dry tetrahydrofuran was stirred and 8.236 g. of diphenylarsine chloride was added followed by 0.65 g. of lithium wire. No evidence of reaction (expected formation of red color) was apparent after stirring at room temperature (circa 20° C.) for several hours. Accordingly, the mixture was heated to reflux to initiate reaction and the reaction mixture was removed from the source of heat and allowed to stand at room temperature overnight, with stirring. A deep red colored reaction mixture was obtained. The latter was treated with a few drops of methanol and the insoluble material was isolated by filtration and washed successively with 200 ml. portions of a mixture of methylene chloride and methanol (2:3 volume ratio), methanol alone, mixtures of methylene chloride and methanol in the volume ratio of 3:1 followed by 9:1 and finally methylene chloride alone. The resulting product was then washed with two 200 ml. portions of acetone and dried in vacuo.

A suspension of the product so obtained (29.9 g.) in 150 ml. of acetone was stirred at room temperature while a total of 5.6 ml. of 30 percent v/v hydrogen peroxide was added. The resulting mixture was then allowed to stand for a short period and the acetone removed with a filter stick, after which 250 ml. of toluene was added and the mixture was refluxed using a Dean and Stark apparatus to remove water azeotropically. The dried suspension was filtered and washed successively with 250 ml. of methanol and 250 ml. of methylene chloride and then with 200 ml. of each of mixtures of methylene chloride and methanol containing ratios by volume of the two solvents of 2:3, 3:1 and 9:1, respectively, and finally with methylene chloride alone. The washed product was dried at 80° C. in vacuo. The product was found to contain 2.16% arsenic corresponding to the presence in the polymer of 10 percent of the recurring units of the following formula:

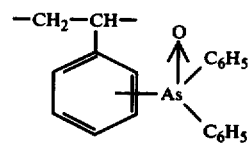

The product was also found to contain 0.0145 percent of bromine indicating that 0.03 percent of the recurring units contained a bromine atom. The remaining units in the polymer chain were unsubstituted units of the formula:

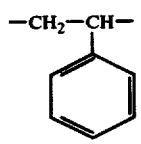

PREPARATION 5

Following the procedures described in Preparation 4 a batch (30 g.) of 2% divinylbenzene cross-linked polystyrene beads (200–400 mesh: Eastman Kodak) was brominated using 10 g. of bromine, a portion (15 g.) of the brominated polystyrene was reacted with diphenylarsine chloride (3.6 g.) in the presence of lithium wire (1.3 g.) and the resulting product (19.6 g.) was oxidized to give a modified polystyrene which contained 0.11 percent of arsenic and 3.04 percent of bromine corresponding to the presence in the polymer of 0.51 percent of recurring units of the formula:

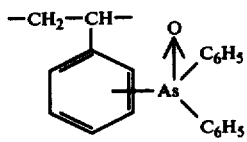

and 6.95 percent of recurring units of the formula:

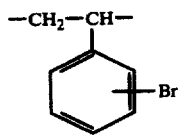

the remainder of the recurring units of the polymer being unsubstituted units of the formula

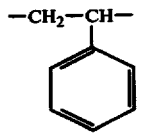

EXAMPLE 1

A mixture of 125.0 g. (0.5 mole) of 4,4'-methylenebis(phenyl isocyanate) [4,4'-isomer content = circa 98 percent] and 0.9 g. of the organoarseno-modified polystyrene (prepared as described in Preparation 1) was heated slowly, with vigorous stirring, to 125° C. at which point evolution of carbon dioxide began. After heating at 125° to 131° C. for a further 30 minutes, a total of 1.24 liters (0.06 mole at standard conditions) of carbon dioxide had been collected. At this point the mixture was filtered and the filtrate was cooled to 60° C. and maintained thereat with stirring for 3 hours before being allowed to stand overnight at room temperature (circa 20° C.). The product so obtained was a water-white liquid with an isocyanate equivalent of 145. A sample of the material was analyzed for traces of arsenic and none could be detected (method sensitive to 10 ppm). After storing in a refrigerator at 10° C. for several weeks, the material still remained liquid and mobile.

The catalyst recovered from the above experiment was used as catalyst in a second run using the same amount of diisocyanate. The results of this second run were identical to those obtained in the above run.

EXAMPLE 2

A batch of 125 g. (0.5 mole) of 4,4'-methylenebis(phenyl isocyanate) [4,4'-isomer-content = circa 98 percent] was heated to 90° C. and 8.6 g. of the organoarseno-modified polystyrene prepared as described in Preparation 5 as added. The resulting mixture was stirred and heated at 98.5°–111° C. for 26 minutes. At the end of this time a total of 1.1 liters of carbon dioxide had been evolved corresponding to conversion of 0.09 equivalents of the diisocyanate to carbodiimide. At this point the mixture was filtered hot to remove the catalyst and the filtrate was maintained at 60° C. for 3 hours before being cooled to room temperature. There was thus obtained a water-white liquid having an isocyanate equivalent of 143. This liquid remained colorless and showed no signs of deposition of solid after storage at room temperature (20°–25° C.) for a period of several months.

We claim:

1. A process for preparing a carbodiimide-containing organic polyisocyanate said process comprising:
heating an organic polyisocyanate to a temperature in the range of about 70° C. to about 200° C. in the presence of a catalytic amount of a polymer characterized in that from 0.1 percent to 100 percent of the recurring units have the formula

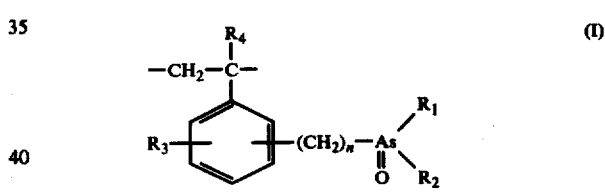 (I)

wherein $R_1$ and $R_2$ are hydrocarbyl free from substituents reactive with isocyanate groups, $R_3$ is selected from the class consisting of hydrogen, chloro and methyl, $R_4$ is selected from the class consisting of hydrogen and methyl, and n is an integer from 0 to 1 and the remainder of the recurring units in said polymer have the formula

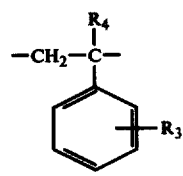

wherein $R_4$ and $R_3$ are as above defined;
continuing said heating until the desired proportion of carbodiimide-formation has occurred; and
stopping said reaction by separating the solid catalyst from the carbodiimide containing organic polyisocyanate.

2. The process of claim 1 wherein the recurring unit (I) has the formula:

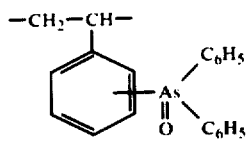

3. The process of claim 1 wherein said organic polyisocyanate is methylenebis(phenyl isocyanate).

4. The process of claim 1 wherein said organic polyisocyanate is a toluene diisocyanate selected from the class consisting of 2,4-toluene diisocyanate, 2,6-toluene diisocyanate and mixtures thereof.

5. A process for preparing a storage stable liquid form of methylenebis(phenyl isocyanate) which comprises
heating methylenebis(phenyl isocyanate) at a temperature in the range of about 70° C. to about 200° C. in the presence of a catalytic quantity of a polymer characterized in that from 0.1 percent to 100 percent of the recurring units have the formula:

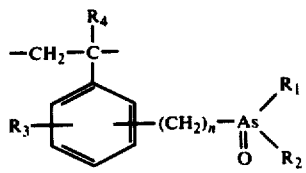

(I)

wherein $R_1$ and $R_2$ are hydrocarbyl free from substituents reactive with isocyanate groups, $R_3$ is selected from the class consisting of hydrogen, chloro and methyl, $R_4$ is selected from the class consisting of hydrogen and methyl and n is an integer from 0 to 1 and the remainder of the recurring units of said polymer have the formula

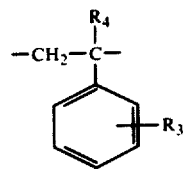

wherein $R_3$ and $R_4$ are as defined above;
continuing said heating until from about 3 percent to about 25 percent of the isocyanate groups in said methylenebis(phenyl isocyanate) have been converted to carbodiimide groups; and
thereupon separating the solid catalyst from the liquid polyisocyanate.

6. The process of claim 5 wherein the recurring unit (I) has the formula:

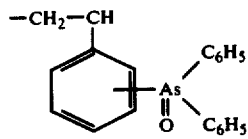

7. The process of claim 5 wherein said methylenebis(phenyl isocyanate) employed as starting material contains from about 85 percent to about 98 percent of the 4,4'-isomer.

8. The process of claim 5 wherein said methylenebis(phenyl isocyanate) employed as starting material is present in admixture with oligomeric polymethylene polyphenyl polyisocyanates.

* * * * *